(12) United States Patent
Borgendale et al.

(10) Patent No.: US 6,457,132 B1
(45) Date of Patent: Sep. 24, 2002

(54) CALENDAR-BASED POWER MANAGEMENT

(75) Inventors: Kenneth Wayne Borgendale; Herman Rodriguez, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,626

(22) Filed: Jun. 30, 1999

(51) Int. Cl.[7] .............................................. G06F 1/32
(52) U.S. Cl. ...................................................... 713/320
(58) Field of Search ................................ 713/300, 310, 713/320

(56) References Cited

U.S. PATENT DOCUMENTS

| | | | | |
|---|---|---|---|---|
| 4,213,063 A | * | 7/1980 | Jones, Sr. ................... 307/141 |
| 5,974,552 A | * | 10/1999 | Lim et al. ................... 713/300 |
| 6,134,187 A | * | 10/2000 | Tomiyasu ..................... 368/28 |
| 6,189,106 B1 | * | 2/2001 | Anderson .................... 713/300 |
| 6,317,593 B1 | * | 11/2001 | Vossler ....................... 455/414 |

* cited by examiner

*Primary Examiner*—Glenn A. Auve
(74) *Attorney, Agent, or Firm*—Jeffrey S. LaBaw; David A. Mims, Jr.; Bracewell & Patterson, L.L.P.

(57) ABSTRACT

Upon creation of an event or activity entry within a calendar, the user is prompted to specify a power management mode to associate with the entry if the entry is not of a predefined type. Predefined entry types may be associated with default power management modes which the user may modify. When an event or activity entry associated with a non-null power management mode is reached, the calendar sends a power management event notification to the power manager, which responds appropriately. Thus, a user may specify that the system, if powered on, should automatically shut down for the duration of a planned vacation identified by an entry within the calendar. The system may thus distinguish between events during which the user is unavailable (e.g., on a business trip or at a remote meeting) from events during which the user is available but perhaps not actively using the system for a period. The calendar event power management modes complement and refine the preconfigured system power management schemes to take into account the user's schedule of activities.

30 Claims, 4 Drawing Sheets

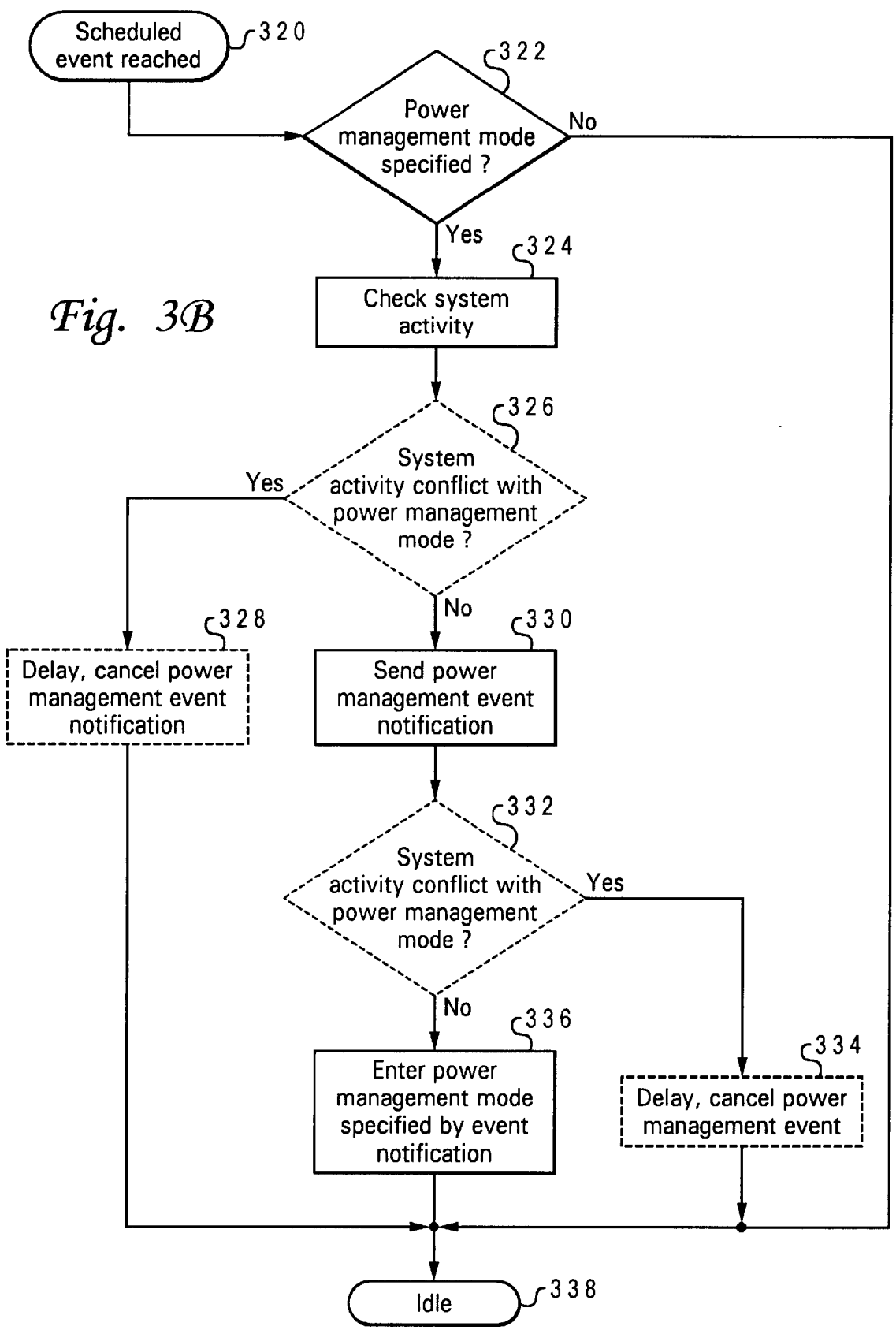

CALENDAR-BASED POWER MANAGEMENT

RELATED APPLICATIONS

The present invention is related to the subject matter of the following commonly assigned, copending U.S. patent applications Ser. No. 09/343,628 entitled "CALENDAR-INDUCED PROGRAM EXECUTION" and filed Jun. 30, 1999; and Ser. No. 09/343,629 entitled "CALENDAR-INDUCED DESKTOP SECURITY" and filed Jun. 30, 1999. The content of the above-referenced applications is incorporated herein by reference.

BACKGROUND OF THE INVENTION

1. Technical Field

The present invention generally relates to power management in data processing systems and other electrically powered devices and in particular to power management keyed to a user activities. Still more particularly, the present invention relates to calendar-based power management allowing automatic power management to conform to a user's scheduled activities.

2. Description of the Related Art

Current power management schemes employed in mobile or desktop data processing systems, personal digital assistants (PDAs) or handheld organizers, "smart" phones, or the like are typically keyed to one of the following:

- inactivity based, usually with respect to the keyboard, the mouse, network, or disk activity;
- power mode based, usually with respect to whether battery or AC power is employed; and
- "location" based, usually with respect to whether the device is docked or undocked.

The principle problem with such power management criteria is the failure to accommodate a user's schedule of activities. For example, if a system is configured to employ a power management scheme based only on power source (AC versus battery) while the machine is running on battery, and the user goes to a long meeting, upon returning he may find a discharged battery. Employing an activity-based power management scheme in conjunction with the power-mode based scheme to cause the system to enter "sleep" mode after a specified period of inactivity may prevent battery discharge under the circumstances described above. However, this may also cause the system to enter "sleep" mode at other times when the user is working but merely does not utilized the system for the timeout period (e.g., while reading or reviewing paperwork).

As another example, if a machine is left running on AC power while a user goes on vacation, the machine may stay running—and consuming power—throughout the time the user is on vacation. Again, the addition of an activity-based timeout period might address the particular instance of the user being on vacation, but could carry over to other times when it would be undesirable for the system to power down merely because of a period of inactivity. The system is unable to distinguish between events or periods when the user might desire automatic shutdown from those in which automatic shutdown would be a nuisance.

It would be desirable, therefore, to enable power management systems to take into account a user's schedule of activities in determining whether to enter a power management cycle.

SUMMARY OF THE INVENTION

It is therefore one object of the present invention to provide improved power management in data processing systems and other electrically powered devices.

It is another object of the present invention to provide power management keyed to a user's activities in data processing systems and other electrically powered devices.

It is yet another object of the present invention to provide calendar-based power management allowing automatic power management to conform to a user's scheduled activities.

The foregoing objects are achieved as is now described. Upon creation of an event or activity entry within a calendar, the user is prompted to specify a power management mode to associate with the entry if the entry is not of a predefined type. Predefined entry types may be associated with default power management modes which the user may modify. When an event or activity entry associated with a non-null power management mode is reached, the calendar sends a power management event notification to the power manager, which responds appropriately. Thus, a user may specify that the system, if powered on, should automatically shut down for the duration of a planned vacation identified by an entry within the calendar. The system may thus distinguish between events during which the user is unavailable (e.g., on a business trip or at a remote meeting) from events during which the user is available but perhaps not actively using the system for a period. The calendar event power management modes complement and refine the preconfigured system power management schemes to take into account the user's schedule of activities.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3B depict high level flow charts for processes of establishing and employing calendar-based power management in accordance with a preferred embodiment of the present invention.

DETAILED DESCRIPTION OF THE PREFERRED EMBODIMENT

Figure 1:
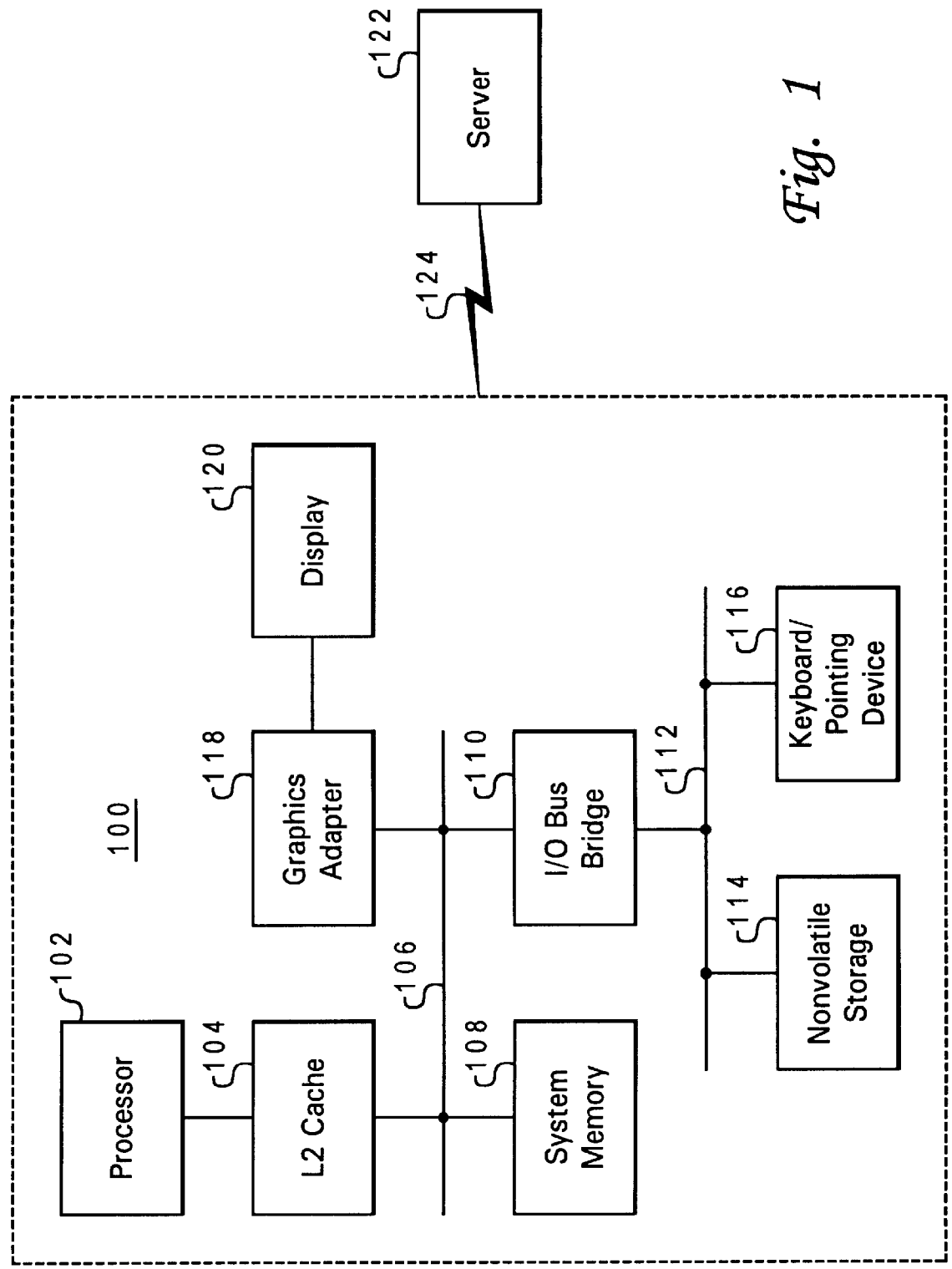
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 includes a processor 102, which is connected in the exemplary embodiment to a level two (L2) cache 104, connected in turn to a system bus 106.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, compact disk read-only memory (CD-ROM) drive, or digital video disk (DVD) drive, and keyboard/pointing device 116, which may include a conventional mouse, a trackball, or the like, are connected to I/O bus 112. Data processing system 100 further includes graphics adapter 116 connected to system bus 106, receiving primitives for rendering from processor 102 and generating pixels for display 120.

The operation of data processing system 100 is well known to those skilled in the art. A basic input/output system (BIOS), power-on self-test (POST), and various startup routines initialize the hardware and permit interaction between hardware components. An operating system, such as a version of the Windows operating system available from Microsoft Corporation of Redmond, Wash., provides a platform for execution of applications and for basic user interaction, such as display of information or manipulation of a cursor within the display by a pointing device. Operating system device drivers allow software components to interact with and control hardware components. Data processing system may be connected to a server 122 via a communications link 124 in accordance with known networking techniques. In the present invention, either the operating system includes a calendar utility or a calendar application runs on top of the operating system. Additionally, the operating system includes a power manager, and may include particular hardware employed for power management (e.g., a controller).

Figure 2:
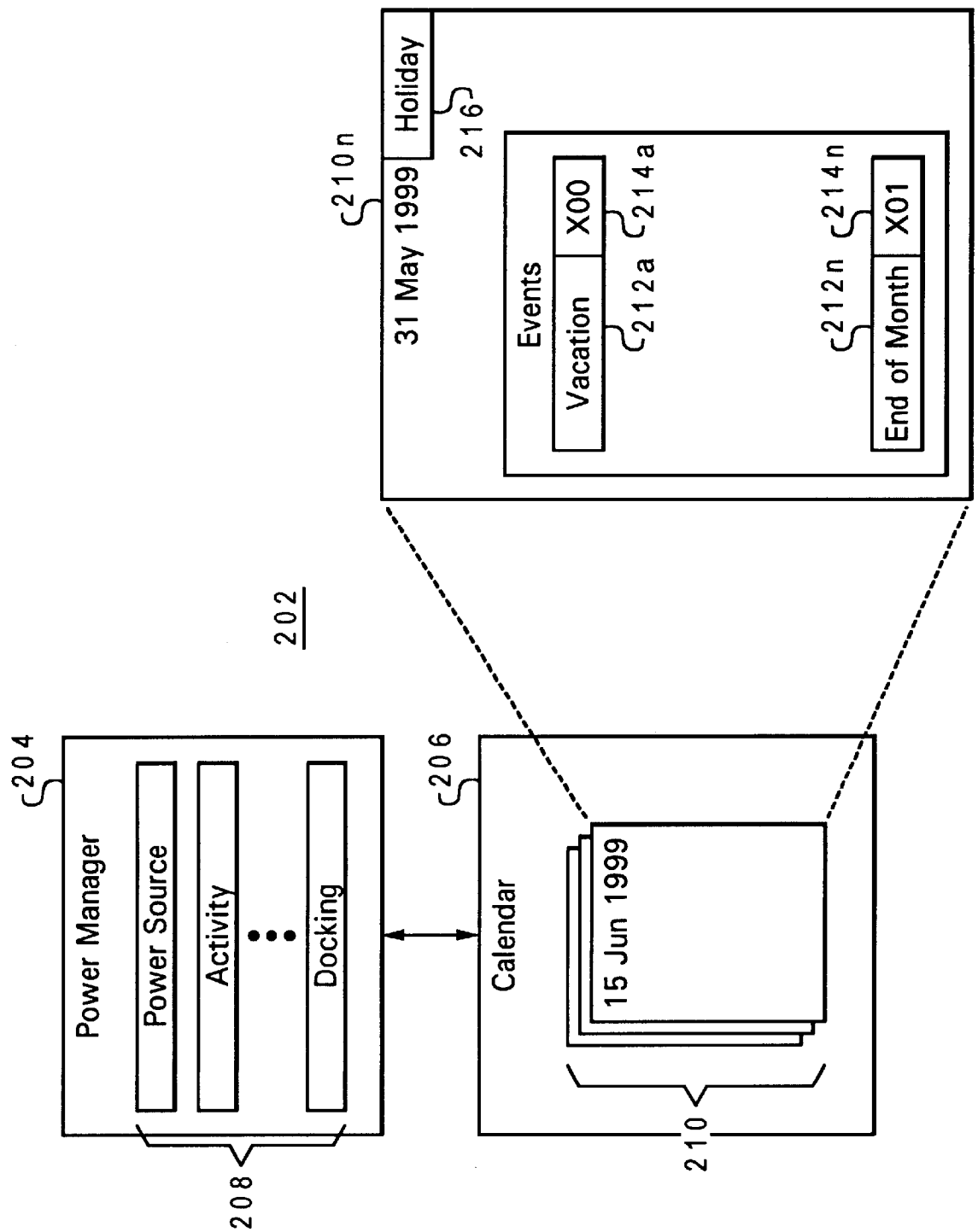
FIG. 2 is a diagram of a calendar based power management system in accordance with a preferred embodiment of the present invention.

Referring to FIG. 2, a diagram of a calendar based power management system in accordance with a preferred embodiment of the present invention is illustrated. Calendar-based power management system 202 includes a power manager 204 and a calendar 206.

Power manager 204 tracks the state of various system parameters 208, such as whether the current power source is AC or a battery, the time since the last keyboard or mouse activity, and whether the system is docked. Based on the values of these parameters 208 at any given time, power manager 204 maintains the system in one of several power management modes, such as fully powered, "sleep" or reduced power mode, and powered down. Power manager 204 may also cause the system to change between power management modes when the value of one or more parameters 208 changes.

Calendar 206 contains a plurality of data objects or records 210 for each date within a range of dates, such as all dates within a given year and/or each date for which some event is created. The user may create entries 212a–212n within any given date 210n, which entries 212a–212n specify events or activities within the user's schedule. Such events or activities may include "Vacation," "Trip," "Meeting," "Out-of-Office Meeting," etc. The events or activities specified by an event entry 212a–212n may be one of a number of predefined events or activities, or may be a user-defined event or activity.

During creation of an event entry 212a–212n, the user is prompted (as a menu option, for example) to specify a power management mode 214a–214n in which the system should be placed for the duration of the event. Thus, for example, for a vacation entry, a user may specify that the system should be powered down, since leaving the machine on would be energy wasteful. If the user has not turned the system off prior to going on vacation, the power manager will shut down the system for the user. Particular dates 210n, such as holidays, may also have an associated power management mode 218.

The power management mode 214a–214n may be predefined for certain event or activity types, such as "Vacation" or "Meeting." Such predefined power management modes 214a–214n may simply be a default for that event type, and the user may be provided the option of overriding or altering the predefined power management mode 214a–214n. If the power management mode 214a–214n is not predefined for a particular event type, or if an event entry 212a–212n is created which is not a predefined event type, the user is prompted to set the power management mode 214a–214n in which the system should be placed for the duration of the event.

To enable the user to set the power management mode 214a–214n for an event entry 212a–212n, a list of possible power management modes may be displayed to the user. Alternatively, the user may be prompted to answer a series of questions (e.g., "Will you be needing the system for this event?"), and the power management mode 214a–214n set for the event entry 212a–212n based on the user's answers (i.e. a "wizard").

During subsequent system operation, when the date and time for an event entry 212a–212n is reached, calendar 206 automatically sends the appropriate power management event to the operating system power manager 204. Power manager 204 may then determine whether the specified power management mode should be entered. It is preferable that calendar 206 not blindly send the power management event notification to the power manager 204, and that the power manager 204 not automatically enter the specified power management mode for the duration of the event, since other circumstances may override the calendar event entry 212a–212n.

For example, if a user should skip a scheduled meeting for which an event entry was created in order to continue working, calendar 206, upon detecting ongoing activity for some period following the scheduled beginning of the event, may skip sending the power management event notification to the power manager 204. Similarly, power manager 204 may detect the continued presence of the user via system activity, and simply ignore the power management event sent by calendar 206. In either case, the result is that the system remains in a prior, existing power management mode until at least the next event entry within calendar 206.

Whenever the date and time for the beginning of a scheduled user activity within calendar 206 is reached while a system is running, calendar 206 updates power manager 204 with the appropriate power management mode. For long events, such as a week-long business trip or vacation, calendar 206 may update power manager 204 with the appropriate power management mode 214a–214n on a periodic basis (e.g., daily). Thus, if the user gets a late start on the event and the power management mode is initially ignored due to detection of ongoing system activity, the applicable power management mode will eventually be entered for the duration of the event.

The user's calendar 206 and the power management mode 214a–214n associated with event entries 212a–212n within calendar 206 complement and refine pre-configured power management schemes. For example, the user may specify that the system should be powered down following detection of a predetermined period of inactivity during an event entry 212a–212n. This allows inactivity-based power management to be employed for periods when the user is scheduled not to be available, but not during periods when the user is scheduled to be working with the system. Accordingly, the benefit of inactivity-based power management may be obtained without the nuisance of a system shut down while a user is working.

While a data processing system is employed as the exemplary embodiment, the present invention finds application in any device employing power management and providing a user calendar function. This includes personal digital assistants such as the popular "Palm" line of hand-held organizers, and smart phones. Specific refinements appropriate to different types of devices are also possible. For instance, if the present invention is implemented within a smart phone, in which a user schedules travel (in the calendar function) to a city where the no wireless carrier provides service to the user, the smart phone may automatically shut down and remain powered down for the duration of the trip.

Figure 3A:
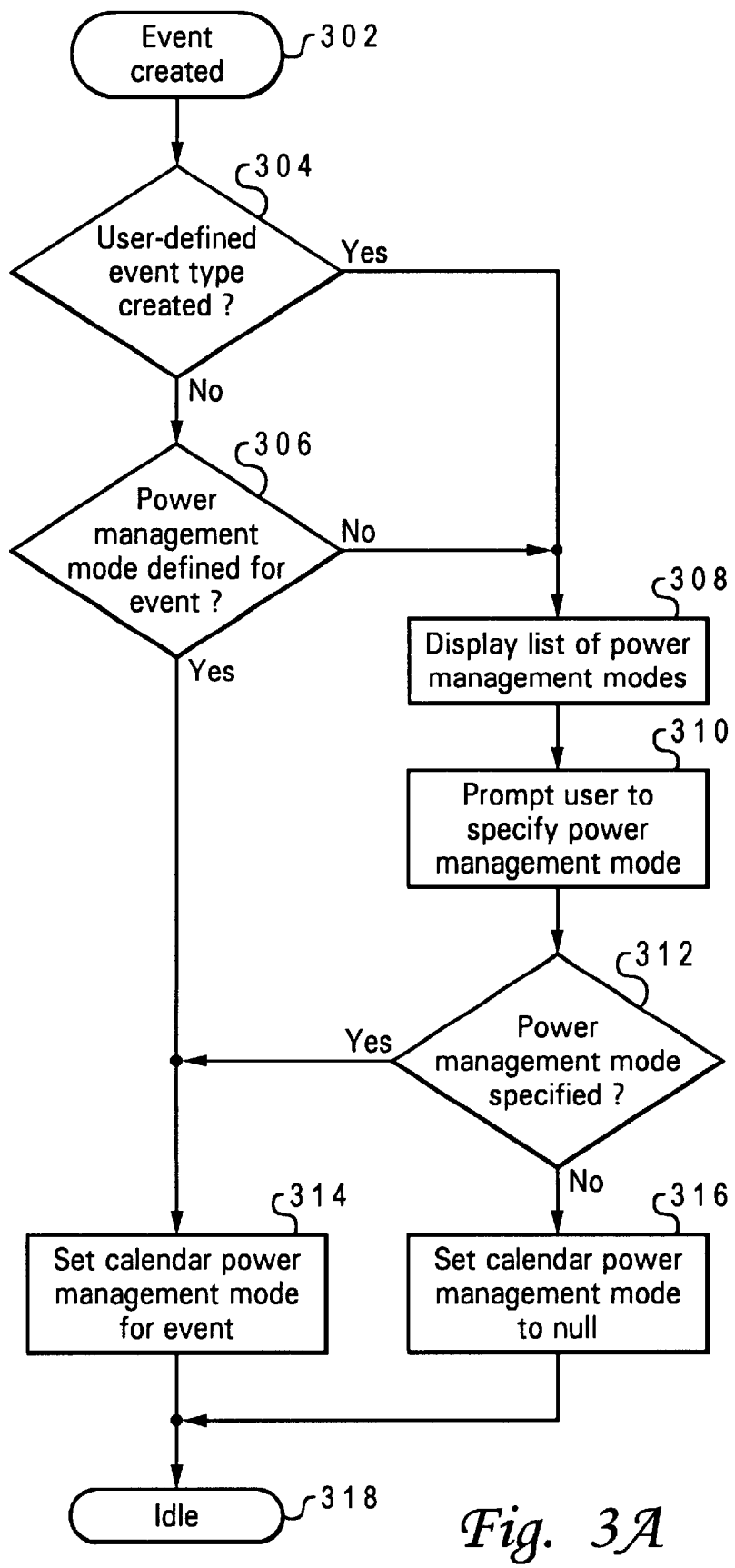

With reference now to FIGS. 3A and 3B, high level flow charts for processes of establishing and employing calendar-based power management in accordance with a preferred embodiment of the present invention are depicted. The process of establishing calendar based power management, depicted in FIG. 3A, begins with step 302, which depicts an event or activity entry being created within a user's calendar.

The process then passes to step 304, which depicts a determination of whether a new user-defined event entry type (i.e., not predefined or previously user-defined) was created. If not, the process proceeds to step 306, which illustrates a determination of whether a power management mode is specified for the event entry type created. Predefined event entry types (e.g., "Vacation") may have associated default power management modes (typically "off" for the example of "Vacation") within their definition. Alternatively, the user may have previously defined the event entry type selected (e.g., "Mom's house") for the event or activity entry created, and specified a power management mode to be associated with event entries of that type.

If a new user-defined event type is created (step 304), or if no power management mode is specified for the entry type of the entry just created (step 306), the process proceeds instead to step 308, which illustrates displaying a list of possible power management modes for a user, and then to step 310, which depicts prompting the user to specify a power management mode for the event entry just created. The process then passes to step 312, which illustrates a determination of whether a power management mode has been specified for the event entry just created within the user's calendar.

If a power management mode is defined for an event type of the newly-created event entry (step 306), or if the user specifies a power management mode to associate with the event entry (step 312), the process proceeds to step 314, which depicts setting the power management mode as specified or defined for the just-created event entry. Otherwise, the process proceeds instead to step 316, which illustrates setting the power management mode associated with the event entry to a null value. The null value is only for the calendar program, and the power management module will not utilize this null value but will instead merely continue a preexisting or default power management mode.

From either of steps 314 or 316, the process next passes to step 318, which depicts the process becoming idle until another event or activity entry is created in the user calendar. The calendar, however, should be preconfigured to send a power management event notification to the power manager when beginning date and time for an event having a non-null calendar power management mode associated with the event entry is reached.

Events may have a predetermined or configurable delay relative to the start time of an event, so that the power management mode is not entered immediately at the start of the corresponding event, but at some predetermined time interval after the start of the corresponding event. This allows users to set a delay if they may need to keep working and decide to arrive late to the event (e.g., for a user arriving at a meeting five minutes after it starts). A warning may be associated within the start of an event, reminding the user of the event and allowing the user to select a delay for the associated power management mode.

Also, when notifying the power management module of an event, the calendar program should check events with are contiguous with or overlap the subject event, notifying the power management module if a selected power management mode should be continued beyond the duration of the subject event, or changed at the end of the subject event.

The process of employing calendar based power management, depicted in FIG. 3B, begins at step 320, which illustrates the start date and time of a scheduled event within a user's calendar being reached. The process then passes to step 322, which depicts a determination of whether a power management mode was specified for the event and associated with the event entry. If so, the process proceeds to step 324, which illustrates checking the system activity. That is, keyboard and mouse activity may be checked, as well as hard drive and network card activity.

The process then passes to optional step 326, which illustrates a determination of whether the detected system activity conflicts with the specified power management mode. For example, if the event entry power management mode indicates that the user will be unavailable and the system should be shut down for the duration of the event, but system activity shows that the user is continuing to use the system, the user may not wish to have the system shut down. If such a conflict is detected, the process may proceed to optional step 328, which depicts delaying or cancelling the power management event notification.

If optional step 326 is not implemented, or if no conflict between system activity and the specified power management mode is perceived, the process proceeds instead to step 330, which illustrates sending the power management event notification to the power manager. The process may then proceed to optional step 332, which again depicts a determination of whether detected system activity conflicts with the specified power management mode.

Step 332 may be implemented in lieu of step 326, with the conflict checking performed in the power manager after the power management event notification has been received, or vice versa, with conflict checking taking place within the calendar before the power management event notification is sent. Alternatively, neither or both of steps 326 and 332 may be implemented. In the latter case, step 326 may be implemented only to check for system activity indicating the presence of the user, while step 332 may be implemented to further check for system activity indicating remote access to the system, such as hard drive or network adapter activity.

If step 332 is implemented and a conflict is perceived between the power management event and the detected system activity, the process may proceed to step 334, which illustrates delaying or cancelling the power management event to be initiated in response to the notification. If step 332 is not implemented, or if no conflict exists between detected system activity and the power management event to be initiated, the process proceeds instead to step 336, which depicts entering the power management mode specified by the power management event notification. The process then passes to step 338, which illustrates the process becoming idle until another scheduled event on the user's calendar is reached.

The present invention allows entries within a user's calendar to be associated with power management events, complementing and refining the power management schemes employed within a data process system. The invention is particularly beneficial in integrated systems where hardware, operating system and applications are all interlocked rather than disjointed or even contradictory. By making applications such as Lotus Organizer or Lotus Notes Calendar assist in controlling power management, rather than power management which is blind to the user's schedule of activities as found in the prior art, battery longevity may be improved.

The present invention may also be combined with program scheduling utilities to improve overall performance. For example, if a calendar entry causes the system to shut down for a user's week-long vacation, the power manager may cause the system to power up for execution of a scheduled program during that week (e.g., an end-of-month online banking statement transfer), then shut down following completion of the scheduled task.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of calendar based power management, comprising:
    creating a calendar entry that does not indicate an associated power management parameter within a user calendar;
    associating a calendar event type with the calendar entry;
    determining an associated power management parameter as a function of the associated calendar event type, wherein the associated power management parameter specifies a power management mode to be initiated upon reaching a start time for the calendar entry.

2. The method of claim 1, wherein the step of creating a calendar entry within a user calendar further comprises:
    setting the associated power management parameter to a predefined value for the associated calendar event type of the calendar entry.

3. The method of claim 1, wherein the step of creating a calendar entry within a user calendar further comprises:
    prompting the user to specify the associated power management parameter.

4. The method of claim 1, wherein the step of determining the associated power management parameter with the calendar entry further comprises:
    associating an identifier of a power management mode with the calendar entry.

5. The method of claim 1, wherein the step of determining the associated power management parameter with the calendar entry further comprises:
    associating a power management event with the calendar entry.

6. A method of calendar based power management, comprising:
    determining whether a start time for a calendar entry that does not indicate an associated power management parameter within a user calendar has been reached, wherein the calendar entry has an associated calendar event type;
    responsive to determining that the start time has been reached, determining whether a power management parameter is associated with the associated calendar event type; and
    responsive to identifying a power management parameter associated with the associated calendar event type, performing a power management process utilizing the power management parameter.

7. The method of claim 6, wherein the step of determining whether a power management parameter is associated with the associated calendar event type further comprises:
    determining whether a power management mode has been specified for the calendar entry.

8. The method of claim 6, wherein the step of performing a power management process utilizing the power management parameter further comprises:
    sending a power management event notification corresponding to the power management parameter to a power manager; and
    entering a power management mode specified by the power management event notification.

9. The method of claim 6, wherein the step of performing a power management process utilizing the power management parameter further comprises:
    responsive to detecting system activity conflicting with a power management mode specified by the power management parameter, delaying or cancelling initiation of the power management mode.

10. The method of claim 6, wherein the step of performing a power management process utilizing the power management parameter further comprises:
    setting a power management event to occur at a subsequent time; and
    entering a power management mode specified in the power management parameter.

11. A system for calendar based power management, comprising:
    a user calendar containing a calendar entry that does not indicate an associated power management parameter; and
    a power management parameter associated with the calendar entry as a function of a calendar event type for the calendar entry, wherein the associated power management parameter specifies a power management mode to be initiated upon reaching a start time for the calendar entry.

12. The system of claim 11, wherein the calendar entry further comprises:
    a predefined value for the calendar event type of the calendar entry which is employed in setting the associated power management parameter.

13. The system of claim 11, wherein the power management parameter further comprises:
   a use-specified power management mode.

14. The system of claim 11, wherein the power management parameter further comprises:
   a power management event.

15. A system for calendar based power management, comprising:
   a user calendar containing a calendar entry that does not indicate an associated power management parameter, wherein the calendar entry has an associated calendar event type; and
   a power manager performing power management processes in response to receiving power management event notifications from the user calendar,
   wherein the user calendar determines whether a start time for a calendar entry within the user calendar has been reached, and
   responsive to determining that the start time has been reached, determines whether a power management parameter is associated with the calendar entry as a function of the associated calendar event type, and
   responsive to determining a power management parameter is associated with the calendar entry, sends a power management event notification to the power manager.

16. The system of claim 15, wherein the user calendar determines whether a power management mode has been specified for the calendar entry, and, responsive to finding a power management mode specified for the calendar entry, sends a power management event notification corresponding to the power management mode to the power manager.

17. The system of claim 16, wherein the power manager initiates a power management mode specified by the power management event notification.

18. The system of claim 17, wherein the power manager sets a power management event to occur at a subsequent time before initiating the power management mode specified in the power management parameter.

19. The system of claim 15, wherein the user calendar checks for system activity conflicting with a power management mode specified by the power management parameter, and, responsive to detecting system activity conflicting with the power management mode, delays or cancels sending the power management event notification.

20. The system of claim 15, wherein the power manager checks for system activity conflicting with a power management mode specified by the power management parameter, and, responsive to detecting system activity conflicting with the power management mode, delays or cancels initiating the power management event mode.

21. A computer program product within a computer usable medium, comprising:
   instructions for creating a calendar entry that does not indicate an associated power management parameter within a user calendar;
   instructions for associating a calendar event type with the calendar entry;
   instructions for determining an associated power management parameter as a function of the associated calendar event type, wherein the associated power management parameter specifies a power management mode to be initiated upon reaching a start time for the calendar entry.

22. The computer program product of claim 21, wherein the instructions for creating a calendar entry within a user calendar further comprise:
   instruction for setting the associated power management parameter to a predefined value for the associated calendar event type of the calendar entry.

23. The computer program product of claim 21, wherein the instructions for creating a calendar entry within a user calendar further comprise:
   instructions for prompting the user to specify the associated power management parameter.

24. The computer program product of claim 21, wherein the instructions for associating a power management parameter with the calendar entry further comprise:
   instructions for associating an identifier of a power management mode with the calendar entry.

25. The computer program product of claim 21, wherein the instructions for associating a power management parameter with the calendar entry further comprise:
   instructions for associating a power management event with the calendar entry.

26. A computer program product within a computer usable medium, comprising:
   instructions for determining whether a start time for a calendar entry that does not indicate an associated power management parameter within a user calendar has been reached, wherein the calendar entry has an associated calendar event type;
   instructions, responsive to determining that the start time has been reached, for determining whether a power management parameter is associated with the associated calendar event type; and
   instructions, responsive to identifying a power management parameter associated with the associated calendar event type, for performing a power management process utilizing the power management parameter.

27. The computer program product of claim 26, wherein the instructions for determining whether a power management parameter is associated with the calendar entry further comprise:
   instructions for determining whether a power management mode has been specified for the calendar entry.

28. The computer program product of claim 26, wherein the instructions for performing a power management process utilizing the power management parameter further comprise:
   instructions for sending a power management event notification corresponding to the power management parameter to a power manager; and
   instructions for entering a power management mode specified by the power management event notification.

29. The computer program product of claim 26, wherein the instructions for performing a power management process utilizing the power management parameter further comprise:
   instructions, responsive to detecting system activity conflicting with a power management mode specified by the power management parameter, for delaying or cancelling initiation of the power management mode.

30. The computer program product of claim 26, wherein the instructions for performing a power management process utilizing the power management parameter further comprise.
   instructions for setting a power management event to occur at a subsequent time; and
   instructions for entering a power management mode specified in the power management parameter.

* * * * *